United States Patent
Lowell et al.

(10) Patent No.: US 7,913,226 B2
(45) Date of Patent: Mar. 22, 2011

(54) INTERPOSING A VIRTUAL MACHINE MONITOR AND DEVIRTUALIZING COMPUTER HARDWARE AT RUNTIME

(75) Inventors: David E. Lowell, San Francisco, CA (US); Caroline M. Tice, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1686 days.

(21) Appl. No.: 10/676,557

(22) Filed: Oct. 1, 2003

(65) Prior Publication Data

US 2005/0091365 A1    Apr. 28, 2005

(51) Int. Cl.
 G06F 9/44  (2006.01)
 G06F 9/00  (2006.01)
 G06F 9/455 (2006.01)

(52) U.S. Cl. ............... 717/120; 713/1; 713/2; 718/1

(58) Field of Classification Search .......... 717/120–135; 718/1; 710/1–7, 15–19; 713/1, 2
See application file for complete search history.

(56) References Cited

U.S. PATENT DOCUMENTS

| | | | | |
|---|---|---|---|---|
| 4,253,145 A | * | 2/1981 | Goldberg | 703/21 |
| 4,843,541 A | | 6/1989 | Bean | |
| 5,437,033 A | * | 7/1995 | Inoue et al. | 714/10 |
| 5,522,075 A | * | 5/1996 | Robinson et al. | 718/100 |
| 5,896,141 A | * | 4/1999 | Blaho et al. | 345/541 |
| 5,991,893 A | * | 11/1999 | Snider | 714/4 |
| 6,075,938 A | * | 6/2000 | Bugnion et al. | 703/27 |
| 6,256,657 B1 | | 7/2001 | Chu | |
| 6,397,242 B1 | * | 5/2002 | Devine et al. | 718/1 |
| 6,496,847 B1 | * | 12/2002 | Bugnion et al. | 718/1 |
| 6,785,886 B1 | * | 8/2004 | Lim et al. | 718/1 |
| 6,789,156 B1 | | 9/2004 | Waldspurger | |
| 6,795,966 B1 | * | 9/2004 | Lim et al. | 718/1 |
| 6,832,270 B2 | * | 12/2004 | Das Sharma et al. | 710/15 |
| 6,961,941 B1 | * | 11/2005 | Nelson et al. | 719/319 |
| 6,978,018 B2 | * | 12/2005 | Zimmer | 380/30 |
| 7,225,441 B2 | | 5/2007 | Kozuch | |
| 7,272,799 B2 | * | 9/2007 | Imada et al. | 715/767 |
| 7,370,324 B2 | * | 5/2008 | Goud et al. | 718/1 |
| 2004/0103299 A1 | * | 5/2004 | Zimmer et al. | 713/200 |
| 2004/0117532 A1 | | 6/2004 | Bennett | |
| 2004/0128670 A1 | * | 7/2004 | Robinson et al. | 718/1 |
| 2004/0230794 A1 | * | 11/2004 | England et al. | 713/164 |
| 2005/0076155 A1 | | 4/2005 | Lowell | |
| 2005/0076156 A1 | | 4/2005 | Lowell | |
| 2005/0076324 A1 | * | 4/2005 | Lowell et al. | 717/100 |
| 2005/0081212 A1 | * | 4/2005 | Goud et al. | 718/107 |
| 2005/0091354 A1 | * | 4/2005 | Lowell et al. | 709/223 |

OTHER PUBLICATIONS

Goldberg, Robert P., "Survey of Virtual Machine Research," 1974, Computer, p. 34-45.*
Shriver et al., "An Implementation Scheme for a Virtual Machine Monitor to be Realized on User—Microprogrammable Minicomputers," 1976, ACM, p. 226-232.*
Robin et al., "Analysis of the Intel Pentium's Ability to Support a Secure Virtual Machine Monitor," 2000, USENIX.*
Sugerman et al., "Virtualizing I/O Devices on VMware Workstation's Hosted Virtual Machine Monitor," 2001, USENIX.*
Goldberg, Robert P., "Architectural Principles for Virtual Computer Systems," Feb. 1973, NTIS, p. 1-229.*

* cited by examiner

Primary Examiner — Wei Y Zhen
Assistant Examiner — Qing Chen

(57) ABSTRACT

A virtual machine monitor is interposed between computer hardware and an operating system at runtime. Hardware that is already virtualized can be devirtualized at runtime.

58 Claims, 6 Drawing Sheets

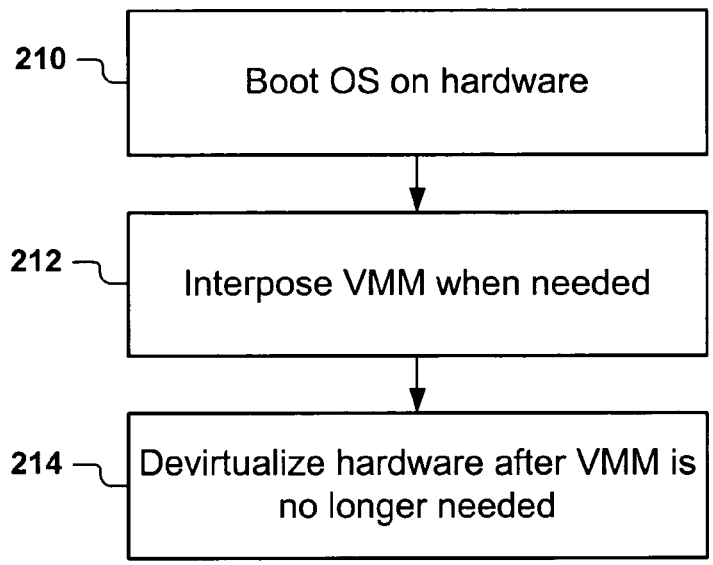
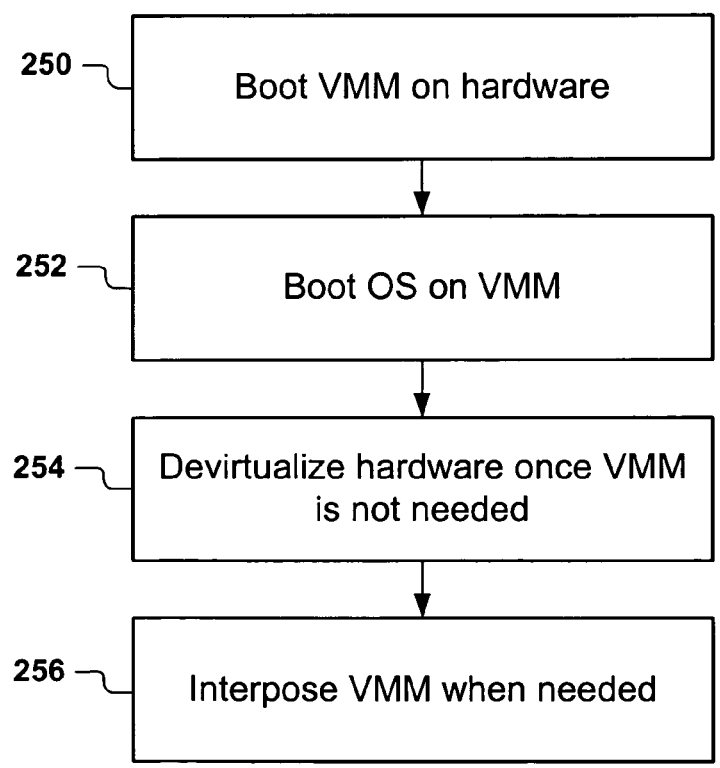

INTERPOSING A VIRTUAL MACHINE MONITOR AND DEVIRTUALIZING COMPUTER HARDWARE AT RUNTIME

BACKGROUND

A virtual machine monitor ("VMM") creates an environment that allows multiple operating systems to run simultaneously on the same computer hardware. In such an environment, applications written for different operating systems (e.g., WINDOWS® operating system, LINUX® operating system) can be run simultaneously on the same hardware.

When an operating system ("OS") is run on a VMM, unprivileged instructions of the operating system execute on the hardware at full hardware speed. However, most or all instructions that access a privileged hardware state trap to the VMM. The VMM simulates the execution of those instructions as needed to maintain the illusion that the operating system has sole control over the hardware on which it runs.

I/O handling involves two levels of device drivers for each device: one maintained by the VMM, and the other maintained by the operating system. When an application requests the operating system to perform an I/O function, the operating system invokes a device driver. That device driver then invokes the corresponding device driver maintained by the VMM to perform the I/O function. Similarly, when an I/O interrupt comes in, a VMM device driver handles the incoming interrupt and may deliver it to the corresponding device driver maintained by the operating system.

The VMM typically handles memory by managing memory translation in order to translate between the OS's use of physical memory, and the real "machine" memory present in hardware.

The VMM adds to the overhead of the computer. Adding the VMM's management of memory to the OS's own memory management slows memory access. The two layers of device drivers add to the overhead by increasing the amount of software that processes I/O requests and interrupts. Overhead is also added by constantly trapping and simulating privileged instructions, and by forcing I/O requests to go through two levels of device drivers. This overhead can slow interrupt handling, increase the fraction of CPU bandwidth lost to software overhead, increase response time, and decrease perceived performance.

The VMM is loaded during bootup of the computer and receives control of the hardware at boot time. The VMM maintains hardware control until the computer is shut down.

Since the VMM has hardware control from bootup to shutdown, overhead is incurred even when the VMM is not needed (for example, when only a single OS instance is running on the hardware). Thus the VMM can add unnecessary overhead to the computer.

It would be desirable to reduce the unnecessary overhead.

SUMMARY

According to one aspect of the present invention, a virtual machine monitor is interposed between computer hardware and an operating system at runtime. According to another aspect of the invention, at least some of the hardware is devirtualized at runtime. Other aspects and advantages of the present invention will become apparent from the following detailed description, taken in conjunction with the accompanying drawings, illustrating by way of example the principles of the present invention.

BRIEF DESCRIPTION OF THE DRAWINGS

FIGS. 2a and 2b are illustrations of methods of using a virtual machine monitor in accordance with different embodiments of the present invention.

DETAILED DESCRIPTION

Figure 1:
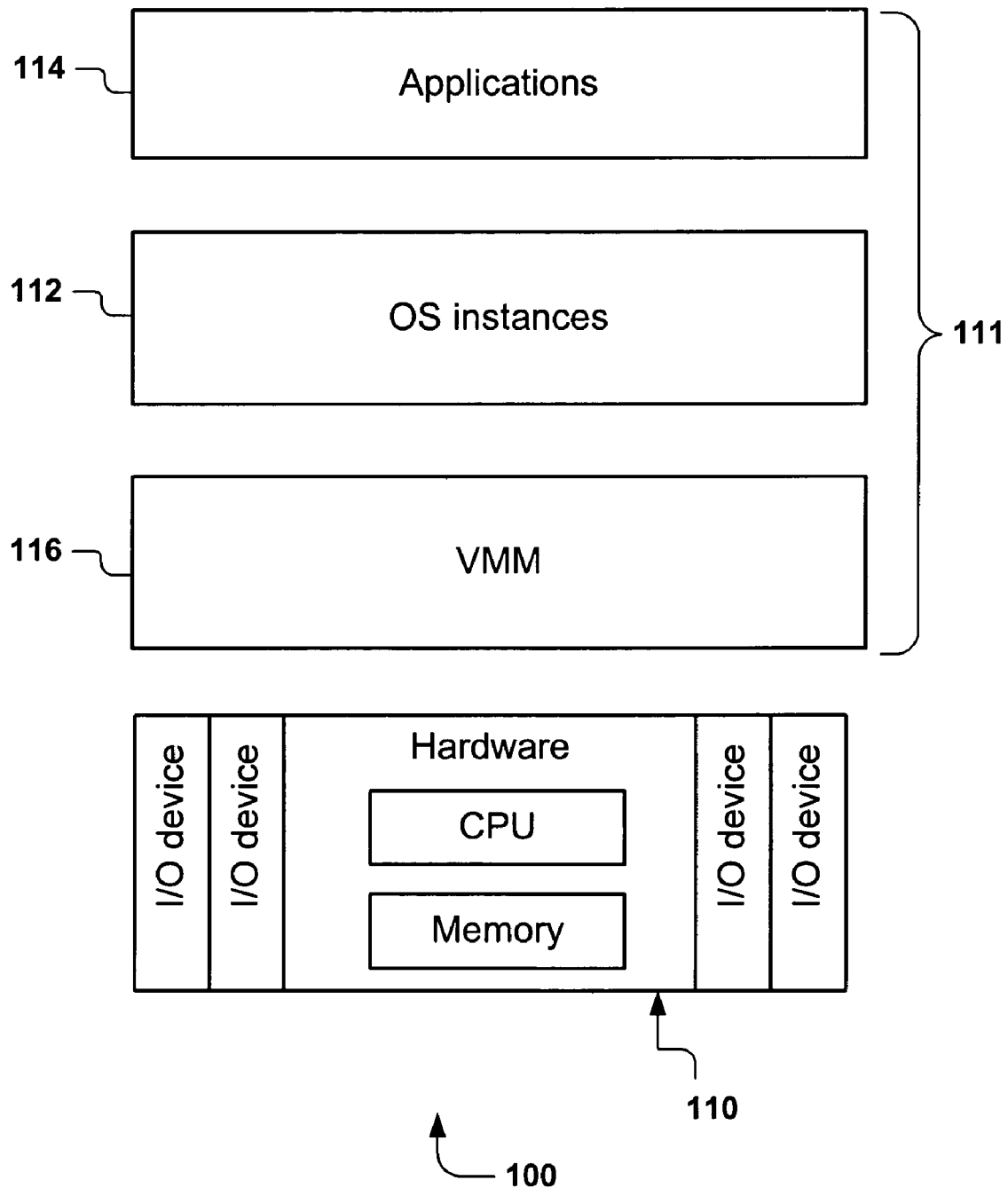
FIG. 1 is an illustration of hardware and software layers of a computer in accordance with an embodiment of the present invention.

As shown in the drawings for purposes of illustration, the present invention is embodied in a computer that can run a virtual machine monitor. The computer is not limited to any particular type. The computer can be, for example, a file server, web server, workstation, mainframe, personal computer, personal digital assistant (PDA), print server, or network appliance. The computer can be contained in a single box, or distributed among several boxes.

Reference is made to FIG. 1, which illustrates hardware and software layers 110 and 111 of a computer 100. The hardware layer 110 includes a central processing unit (CPU), memory and I/O devices. Exemplary I/O devices include, without limitation, network adapters, SCSI controllers, video cards, host bus adapters, and serial port adapters. The memory refers to the memory that is internal to the computer (e.g., internal memory cache, main system memory) as opposed to external storage devices such as disk drives. The software layer 111 includes an operating system or OS instances 112, applications 114, and a virtual machine monitor 116. During execution, the software for the software layer 111 can be stored in "articles" such as the memory; and during distribution, the software can be stored in articles such as external devices, removable storage media (e.g., optical discs), etc.

Additional reference is made to FIG. 2a, which illustrates a method of using the VMM 116. The operating system 112 is loaded during bootup of the computer (210), and takes control of the hardware layer 110 at boot time. As a result, the operating system 112 has direct hardware control over the CPU, the memory, and the I/O devices. The applications 114 may be run on the operating system 112.

The virtual machine monitor 116 is interposed between the hardware layer 110 and the operating system 112 at runtime (212). Runtime is the period of normal execution of the operating system after boot and before shutdown. Interposing the VMM 116 gives the VMM 116 direct control of at least one of the CPU, the memory and the I/O devices. While the VMM 116 has direct control of the CPU, the CPU is said to be "virtualized." Similarly, those portions of physical memory directly controlled by the VMM 116 are said to be virtualized, and those I/O devices directly controlled by the VMM 116 are said to be virtualized. After being interposed, the VMM 116 can then be used for its intended purpose, such as running additional operating system instances. These operating system instances can share the virtualized hardware.

The VMM 116 can be interposed only when needed, which can occur long after the computer has booted. As a result, overhead is reduced, since the VMM 116 does not add to the overhead between computer bootup and actual use.

Once interposed, however, the virtual machine monitor adds overhead to the computer. This overhead can become unnecessary once the VMM 116 is not used for its intended purpose.

This unnecessary overhead can be reduced by devirtualizing the hardware layer 110 (214). Devirtualizing the hardware 110 gives the operating system 112 direct hardware control over at least one of the CPU, the physical memory, and the I/O. The hardware layer 110 may be partially devirtualized, whereby the memory alone is devirtualized, or the I/O alone is devirtualized, or the memory and I/O are devirtualized. If the hardware 110 is fully devirtualized (that is, the operating system 112 is given direct control over the CPU, the physical memory, and the I/O), the VMM can be unloaded from the computer 100.

Reference is made to FIG. 2b, which illustrates an alternative embodiment of a method of using the VMM 116. The VMM 116 is loaded at bootup of the computer (250), and an operating system is booted on the VMM (252). The hardware layer 110 is then devirtualized as soon as the VMM 116 is not needed (254). Devirtualization may be full or partial. For example, the CPU could remain virtualized, but memory and I/O would be devirtualized. The VMM 116 is not unloaded from memory even if the hardware is fully devirtualized. When needed, the VMM 116 is interposed between the operating system and the hardware (256). When the VMM 116 is no longer needed, the hardware layer 110 is devirtualized, either fully or partially. Relative strengths of these two embodiments will become apparent below.

The steps in FIGS. 2a and 2b can be performed or initiated by a system administrator. In the alternative, these steps may be performed or initiated in software by an application, a script, etc.

Figure 3:
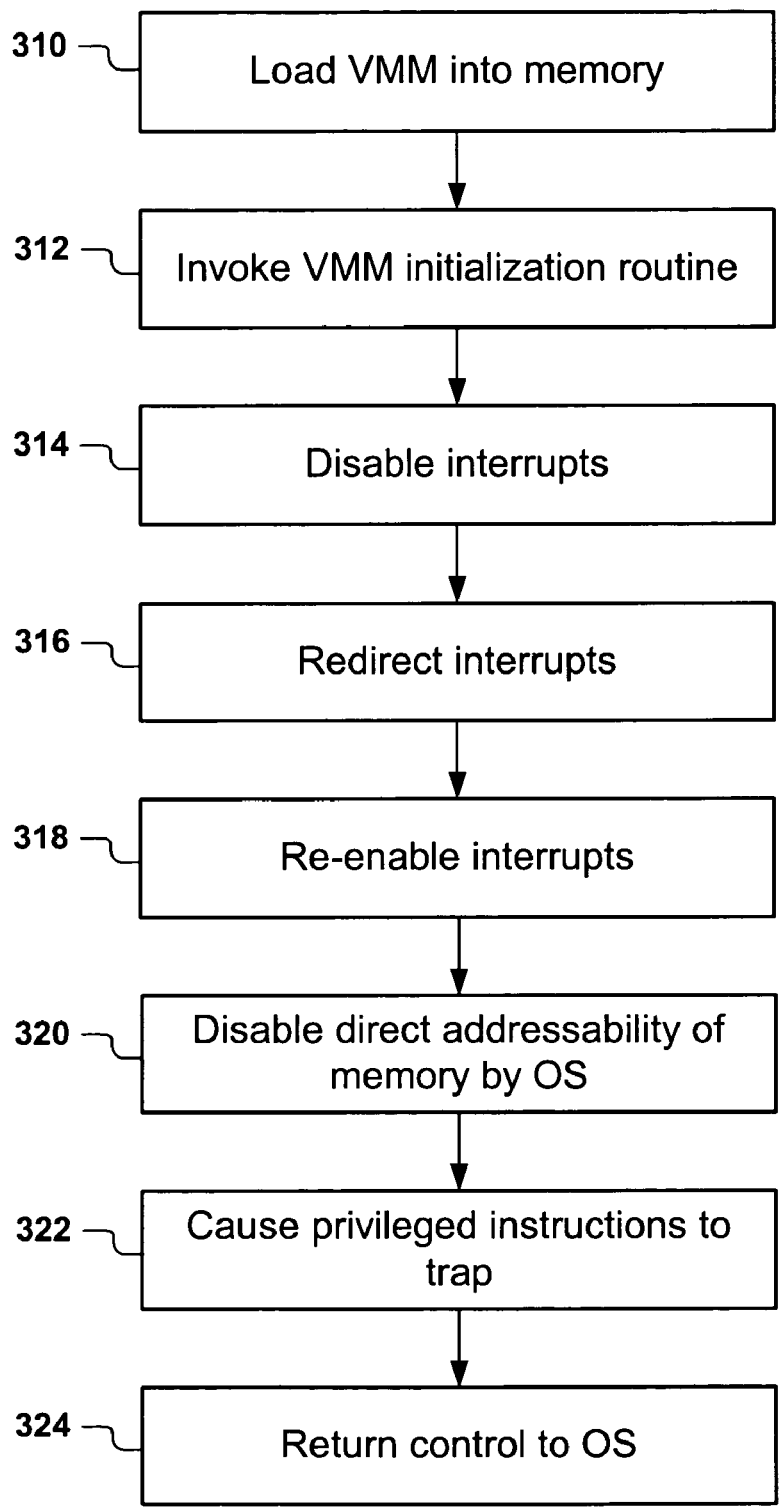
FIG. 3 is an illustration of a method of interposing a virtual machine monitor on a CPU in accordance with an embodiment of the present invention.

Reference is now made to FIG. 3, which illustrates an exemplary method of interposing the VMM 116 at runtime on a CPU. First, the VMM is loaded into memory (310) if it has not been loaded already. This step (310) is not performed if the VMM has already been loaded in advance (e.g. at boot time) without virtualizing the hardware, or if it has been loaded into memory from a prior period in which the VMM virtualized the CPU (e.g., the method shown in FIG. 1b).

If necessary, an OS kernel can be used to invoke an initialization routine in the VMM (312). This routine may go through resource discovery to discover the hardware that is installed in the computer. The initialization routine may also initialize internal VMM data structures and device drivers, and it may also carry out at least one of the following steps (314-324).

Next interrupts are disabled (314). If the VMM has sufficient privilege, it can disable the interrupts. For example, the computer 100 might allow the VMM to disable the interrupt, or the VMM might have been previously booted/devirtualized and retained sufficient privilege to disable the interrupts. If the VMM cannot disable the interrupts, an OS kernel module can be invoked to perform this step.

Interrupts are redirected to handlers in VMM so the VMM gets control on interrupts and traps (316). This step will likely involve modifying the interrupt vector table to invoke VMM handlers rather than OS handlers. Interrupt handlers for the CPU typically include NMI, machine check, timer, interprocessor, and cycle counter.

After the interrupts have been redirected, interrupts are re-enabled (318). After that, the direct addressability of physical memory is disabled (320). Completing this latter step (320) will allow the VMM to manage (e.g. trap or map) access to physical addresses.

Next, privileged instructions are caused to trap to the VMM (322). On some architectures, causing the privileged instructions to trap to the VMM may involve reducing the current processor mode of the CPU (i.e. its privilege level). On other architectures, it may not be necessary to reduce the CPU's privilege level much or at all. For example, on the HP Alpha architecture, the OS usually runs in a fairly unprivileged mode relative to the PALcode (a privileged library between the hardware and operating system). If the VMM is implemented using the privilege afforded the PALcode, then it is not necessary to further reduce the privilege of the OS. For architectures such as Intel x86 and IA-64, causing the OS's privileged instructions to trap to the VMM may involve modifying the OS's executable image in memory. For example, the VMM replaces some instructions that can reveal privileged state without trapping to the VMM. The replacement instructions may instead invoke a routine in the VMM. For some architectures, the VMM may also modify aspects of the OS code to optimize the OS performance.

Control is returned to the OS at this reduced privileged level (324). If the CPU alone is virtualized, the operating system will still have direct control over the physical memory and the I/O devices.

If the VMM is loaded into memory at boot time, firmware or a boot loader can set aside sufficient physical memory for the VMM before the OS boots, and then load the VMM into that range of memory. The firmware or boot loader should shield the booting OS from discovering the range of memory set aside for the VMM, for example, by modifying the table passed to the OS describing the physical memory available for its use.

Figure 4:
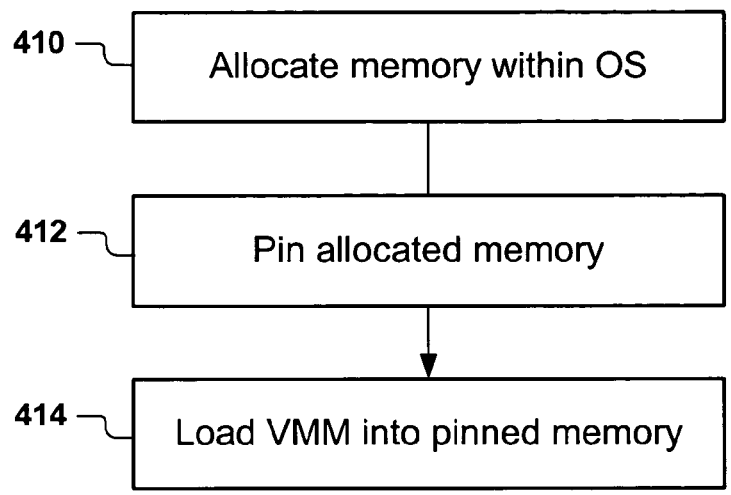
FIG. 4 is an illustration of a method of loading a virtual machine monitor into memory at runtime.

Reference is made to FIG. 4, which illustrates a method of using a kernel module to load the VMM into memory at runtime. First, the kernel module allocates sufficient memory using the kernel module's internal memory allocator (410). Next, the kernel module "pins" those pages of memory to prevent the OS from taking them back prematurely (412). The module may perform the pinning of memory using the OS's internal routines that prevent the OS's page replacement policy from replacing a page of memory in use by a portion of the operating system, such as a device driver. Finally, the module loads the VMM into the allocated memory (414). This step can be performed by the kernel module directly opening the file containing the VMM and issuing the calls to load the VMM into memory. Instead, the kernel module may employ an application outside the OS to load the file. This application could load the file into its own address space in the usual way, then make a call to the kernel module passing a pointer to its copy of the VMM image. The kernel module could then copy the VMM image into the region of memory it allocated and pinned for the VMM.

The VMM may handle memory as follows. When an operating system boots on the VMM (see, e.g., FIG. 2b), the OS claims all of the physical memory that the firmware, boot loader, or VMM exposes to it. So that later OS instances have memory to use, the firmware, boot loader, or VMM sets aside memory partitions for later use by other OS instances. Alternately, the VMM gains control over the running OS's use of the memory. Once it has that control, the VMM can take memory away from the first OS instance that booted for use by other OS instances.

To partition memory for later use by the VMM and operating systems, the boot loader, firmware, or the VMM (if the VMM gets control before the first OS to boot) can modify the table passed to the operating system describing the memory that the OS can use. The table may be modified to expose to the booting OS one partition of memory. The table also may be modified to hide from that OS the memory dedicated to the VMM, and each partition of memory that will be provided to another OS instance.

If an OS boots on the hardware, and claims all the memory in the hardware (see, e.g., FIG. 2b), the VMM performs steps to gain control over that memory. As a first example of gaining control over the memory, the VMM may perform runtime virtualization of the physical memory used by the OS. Such runtime virtualization is disclosed in assignee's U.S. patent application Ser. No. 10/677,159 filed Oct. 1, 2003, U.S. Patent Publication No. 2005/0076156, and incorporated herein by reference. Because the CPU is already virtualized, the VMM already has control over the hardware to perform the method disclosed therein.

As a second example of gaining control over the memory, the VMM may use a device driver or kernel module in the OS to "borrow" memory from the running OS for use by other OS instances in a manner similar to the one depicted in FIG. 4. The VMM can invoke a routine in the kernel module requesting the module to allocate memory using the kernel's internal memory allocator. The module pins that memory to prevent the OS from taking it away, and then hands that block of memory to the VMM. The VMM can then expose that memory to a second OS instance during its boot. Alternately, the VMM can reassign the memory from one running OS instance to another. Using a kernel module in the receiving OS as well, the module would add the pages of memory in the block directly to the OS's "free list" of pages, and increment appropriately its count of free pages in the system. If one instance has borrowed memory from another instance, when that one instance is ready to return memory to its place of origin, the kernel module can allocate pages, decrement the free page counters, and hand the pages to the VMM to return.

The VMM can also perform steps to gain control of the I/O. As a first example, the VMM can virtualize I/O devices at runtime by commencing I/O emulation at runtime as described in U.S. patent application Ser. No. 10/676,922 filed Oct. 1, 2003, U.S. Patent Publication No. 2005/0076155, and incorporated herein by reference. Because the CPU is already virtualized, the VMM already has sufficient control over the hardware to perform the method disclosed therein.

As a second example of interposing the VMM on I/O, the operating system is provided with "dual-mode" drivers. The dual-mode drivers perform direct hardware control in "native" mode and communicate with device drivers of the VMM in "virtual" mode.

For example, consider a dual-mode network card driver whose "send" routine is called. If the mode bit is set to "native", that driver would enqueue the message on its queue of outgoing packets, and eventually issue direct I/O instructions to hand the packet off to the network card for sending. If the mode bit is set to "virtual" the driver would instead pack up the message and invoke the corresponding device driver maintained by the VMM. The corresponding VMM device driver would call its own send routine to send the message. The VMM send routine would then enqueue the message and eventually perform the I/O instructions needed to send the message. Each native device driver in the VMM has a routine for importing the state of the corresponding driver maintained by the operating system, and exporting its state to the corresponding OS driver. When interposing a VMM, the state maintained by the OS's device driver (if any) would be handed off to the VMM's driver via one of these routines.

If the dual-mode network card driver receives a "switch mode to virtual" call, it could delay the processing of new messages while finishing I/Os that have already been enqueued (if draining the queue simplifies the mode switch). Then, if needed, the dual-mode driver could call a routine in the corresponding VMM driver to export to that driver any state the OS driver was maintaining (for some devices or drivers, there may not be any such state). The dual-mode driver could then set its virtual/native mode bit to "virtual", and resume processing messages by forwarding new requests to the appropriate routines in the VMM's native device driver.

Figure 5:
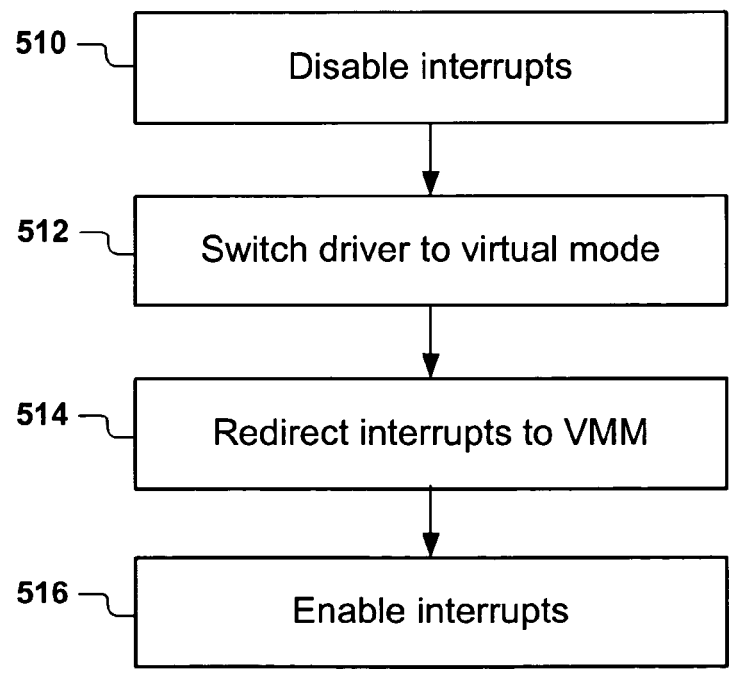
FIG. 5 is an illustration of a method of interposing a virtual machine monitor on an I/O device in accordance with an embodiment of the present invention.

Reference is made to FIG. 5, which illustrates how the dual-mode drivers may be used to interpose the VMM on an I/O device. First, interrupts are disabled (510). Next, the dual-mode driver for this device in the OS is instructed to switch to the virtual mode of operation (512). The driver can be so instructed by the kernel module in the OS, by the VMM already running on the CPU, or by an application that calls an IOCTL (input/output control) routine in the driver. Next, interrupts for the device are redirected to handlers in the VMM, if they were not already redirected when the CPU was virtualized (514). Finally, interrupts are re-enabled (516). From that point on, the OS's dual-mode driver performs I/O by calling the VMM's driver for the device Devirtualization will now be discussed. The VMM can devirtualize one or more of the CPU, memory, and I/O devices. If the CPU is devirtualized, then both memory and I/O are also devirtualized. If the CPU remains virtualized, the memory alone can be devirtualized, or I/O alone can be devirtualized, or both memory and I/O can be devirtualized.

Figure 6:
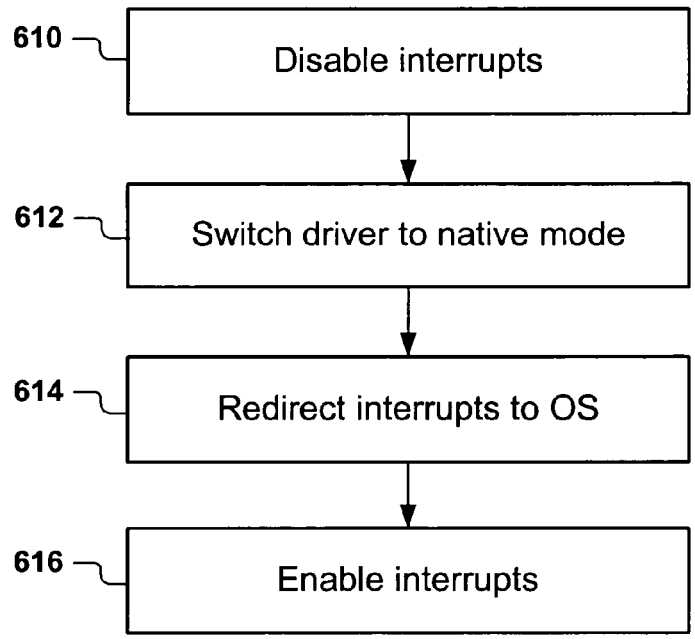
FIG. 6 is an illustration of a method of returning control of an I/O device to an operating system in accordance with an embodiment of the present invention.

Reference is now made to FIG. 6, which illustrates how the VMM can return control of an I/O device to the OS via a dual-mode device driver. The steps in FIG. 5 are reversed. First, interrupts are disabled (610). Next, the dual-mode driver for the I/O device is instructed to switch to the native mode of operation (612). If the dual-mode driver receives a "switch mode to native" call, it could query a routine in the VMM's native driver to import state that driver has been maintaining (if any). That routine would also let the dual-mode driver know that it was safe to start directly issuing I/Os to the I/O device. Next, interrupts for the I/O device are redirected to handlers in the OS (614). Finally, interrupts are re-enabled (616). The dual-mode driver can then begin processing device requests, enqueueing them as needed, and directly issuing I/Os to the I/O device to fulfill those requests, without going through the VMM driver.

If dual-mode drivers are not used, the VMM can devirtualize the device by ceasing emulation of the I/O device at runtime as disclosed in U.S. Patent Publication No. 2005/0076155.

The VMM may devirtualize memory as disclosed in U.S. Patent Publication No. 2005/0076156. The VMM should return control of devirtualized memory to the OS.

If the VMM took control of memory using a special kernel module that could borrow blocks of memory, by the time only one OS runs, all memory used by other OS instances should have been returned by the VMM to the one remaining OS. Similarly, if memory was partitioned at boot time for this OS, the OS already controls its memory partition; thus there is no memory for the VMM to return.

Figure 7:
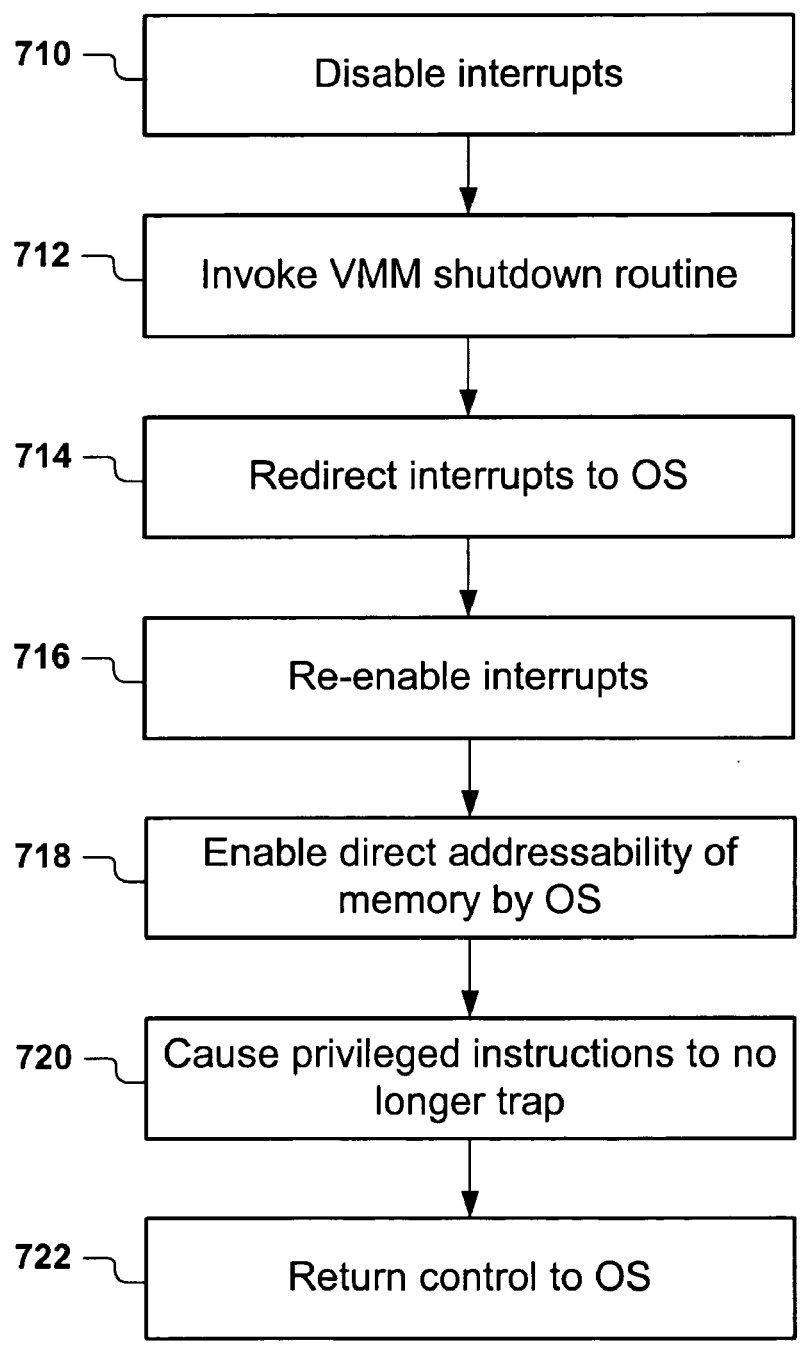
FIG. 7 is an illustration of a method of devirtualizing a CPU in accordance with an embodiment of the present invention.

Reference is now made to FIG. 7, which illustrates an exemplary method of devirtualizing the CPU. When devirtualization commences, only one OS is running on the VMM. The steps of FIG. 3 are reversed. Interrupts are disabled (710), a VMM shutdown routine (if any) is invoked (712), interrupts are redirected to handlers in the OS (714), and interrupts are re-enabled (716). If the OS addresses physical memory, the addressability of physical memory is enabled (718).

Next, privileged instructions are caused not to trap to the VMM (720), and control is returned to the OS (722). On some architectures, causing the privileged instructions not to trap to the VMM may involve restoring the "normal" processor mode (privilege level) of the CPU for the OS. In typical virtual machine systems, the VMM runs in the most privileged processor mode, and it makes the OS run in a less privileged processor mode. By restoring the normal processor mode of the OS (720), the VMM allows the OS to execute without its privileged instructions trapping to handlers in the VMM. In such systems, completing these last two steps (720-722) can involve merely returning control to the OS while leaving the CPU in the processor mode normally reserved for the VMM. In other systems, the VMM may need to set the CPU to a different processor mode before returning to the OS. In systems where the OS runs at a reduced privilege level even when not on a VMM (such as systems based on the HP Alpha architecture), the VMM may not have to restore the normal processor mode. In certain systems, the VMM may modify the OS's executable image in memory. For example, the VMM may modify some of the OS instructions as an optimization, or to cause the OS instructions to trap to the VMM. In these certain systems, the VMM may restore the normal executable image of the OS during step 322 of devirtualization.

Figure 8:
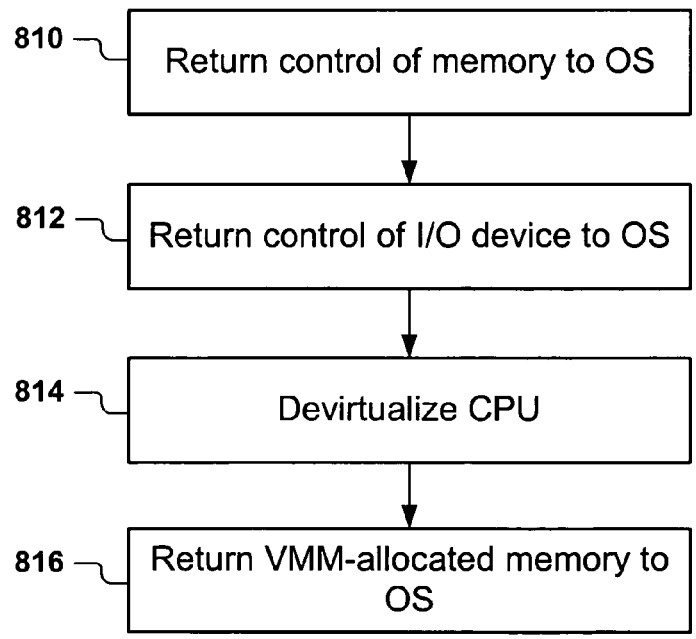
FIG. 8 is an illustration of a method of removing or disabling a VMM in accordance with an embodiment of the present invention.

Reference is now made to FIG. 8. After the hardware has been fully devirtualized, the VMM's activities are completely stopped, control of the hardware is passed to the OS (810), and the VMM can be removed from the system. First, control of memory is returned to the OS (812). Next, control of I/O devices is returned to the OS (814). Next, the CPU is devirtualized (816). It may be desirable to keep the VMM loaded in memory to enable it to quickly virtualize the hardware again later. However, if the memory used for the system was borrowed from an OS, the VMM may also be unloaded by returning the memory to that OS for its use. This last step will likely be carried out using a kernel module or device driver within the OS, as described above.

The present invention is not limited to the specific embodiments described and illustrated above. Instead, the present invention is construed according to the claims that follow.

The claims:

1. A method of using a virtual machine monitor and an operating system on computer hardware in a computer, the method comprising:
    booting the operating system on the computer hardware such that the operating system has direct control of at least a portion of the computer hardware including a central processing unit (CPU), a physical memory, and an input/output (I/O) device;
    interposing the virtual machine monitor between the computer hardware and the operating system at runtime, wherein runtime includes a period of execution in the computer after booting and before shutdown of the computer, wherein the interposing occurs after booting of the computer, and wherein interposing the virtual machine monitor gives the virtual machine monitor direct control of the at least a portion of the computer hardware such that the operating system no longer has direct control of the at least a portion of the computer hardware; and
    devirtualizing the at least a portion of the computer hardware at runtime after the virtual machine monitor has been interposed at runtime, wherein devirtualizing the at least a portion of the computer hardware comprises stopping the virtual machine monitor such that the operating system resumes having direct control of the at least a portion of the computer hardware.

2. The method of claim 1, wherein the virtual machine monitor is interposed on the CPU.

3. The method of claim 2, wherein the virtual machine monitor and the operating system each include CPU interrupt handlers; and wherein interposing the virtual machine monitor on the CPU includes:
    causing privileged instructions to trap to the virtual machine monitor, and redirecting interrupts to the corresponding virtual machine monitor CPU interrupt handlers instead of to the operating system CPU interrupt handlers.

4. The method of claim 3, wherein the privileged instructions are caused to trap to the virtual machine monitor by causing the operating system to run at a reduced privilege level; and wherein interposing the virtual machine monitor on the CPU further includes returning control to the operating system at the reduced privilege level.

5. The method of claim 3, wherein the privileged instructions are caused to trap to the virtual machine monitor by using a kernel module of the operating system to reduce a privilege level of the operating system from a higher privilege level.

6. The method of claim 3, wherein interposing the virtual machine monitor on the CPU further includes disabling physical memory access by the operating system.

7. The method of claim 3, wherein interposing the virtual machine monitor on the CPU further includes loading the virtual machine monitor into the physical memory.

8. The method of claim 7, further comprising using a kernel module of the operating system to allocate memory within the operating system, pin the allocated memory, and load the virtual machine monitor into the pinned memory.

9. The method of claim 2, wherein the virtual machine monitor is also interposed on the physical memory.

10. The method of claim 9, wherein interposing the virtual machine monitor on the physical memory includes partitioning the physical memory to provide partitions, and giving the virtual machine monitor access to at least one of the partitions.

11. The method of claim 9, wherein interposing the virtual machine monitor on the physical memory includes using a kernel module of the operating system to allocate a block of the physical memory, pin the block to prevent the operating system from using the block, and allocate the pinned block to the virtual machine monitor.

12. The method of claim 9, wherein interposing the virtual machine monitor on the physical memory includes commencing using the virtual machine monitor at runtime to manage memory translation.

13. The method of claim 2, wherein the virtual machine monitor is also interposed on the I/O device.

14. The method of claim 13, wherein the operating system includes a dual-mode driver that performs direct hardware control in a first mode and communicates with a device driver of the virtual machine monitor in a second mode; and wherein interposing the virtual machine monitor on the I/O device includes:
    setting the dual-mode driver to the second mode; and redirecting I/O interrupts to interrupt handlers in the virtual machine monitor instead of to interrupt handlers in the operating system.

15. The method of claim 13, wherein interposing the virtual machine monitor on the I/O device includes commencing I/O emulation of the I/O device at runtime.

16. The method of claim 1, wherein the virtual machine monitor and the operating system each include CPU interrupt handlers; and wherein devirtualizing the at least a portion of the computer hardware includes redirecting interrupts to the corresponding operating system CPU interrupt handlers instead of to the virtual machine monitor CPU interrupt handlers.

17. The method of claim 16, wherein devirtualizing the at least a portion of the computer hardware further includes restoring a privilege level of the operating system from a less privileged mode to a more privileged mode.

18. The method of claim 16, wherein devirtualizing the at least a portion of the computer hardware further includes enabling access of the physical memory by the operating system.

19. The method of claim 16, wherein devirtualizing the at least a portion of the computer hardware further includes unloading the virtual machine monitor from the physical memory.

20. The method of claim 1, wherein the physical memory is devirtualized at runtime.

21. The method of claim 1, wherein the I/O device is devirtualized at runtime.

22. The method of claim 1, wherein the operating system includes a dual-mode driver that performs direct hardware control in a first mode and communicates with a device driver of the virtual machine monitor in a second mode; and wherein devirtualizing the at least a portion of the computer hardware includes:
  setting the dual-mode driver to the first mode from the second mode, and
  redirecting I/O interrupts to handlers in the operating system instead of handlers in the virtual machine monitor.

23. A computer comprising hardware, the hardware including a central processing unit (CPU), a physical memory, and an input/output (I/O) device, the physical memory encoded with an operating system, a virtual machine monitor, and code for interposing the virtual machine monitor between the operating system and the hardware at runtime, wherein runtime includes a period of execution in the computer after booting and before shutdown of the computer, and wherein the interposing occurs after booting of the computer,
  wherein the operating system is to be booted on the hardware such that the operating system has direct control of at least a portion of the hardware before interposing the virtual machine monitor, wherein interposing the virtual machine monitor gives the virtual machine monitor direct control of the at least a portion of the hardware such that the operating system no longer has direct control of the at least a portion of the hardware, and
  wherein the physical memory is further encoded with code for devirtualizing the at least a portion of the hardware at runtime after the virtual machine monitor has been interposed at runtime, wherein devirtualizing the at least a portion of the hardware comprises stopping the virtual machine monitor such that the operating system resumes having direct control of the at least a portion of the hardware.

24. The computer of claim 23, wherein the virtual machine monitor is interposed on the CPU at runtime, and the virtual machine monitor and the operating system each include CPU interrupt handlers; and wherein the interposing code is to cause privileged instructions to trap to the virtual machine monitor, and to redirect interrupts and traps to the corresponding virtual machine monitor CPU interrupt handlers instead of to the operating system CPU interrupt handlers.

25. The computer of claim 24, wherein the interposing code is to cause privileged instructions to trap to the virtual machine monitor by causing the operating system to run at a reduced privilege level from a higher privilege level; and wherein the interposing code is to reduce a privilege level of the operating system after redirecting the interrupts, and to return control to the operating system at the reduced privilege level.

26. The computer of claim 24, wherein the interposing code includes a kernel module of the operating system for reducing a privilege level of the operating system from a higher privilege level, whereby the privileged instructions trap to the virtual machine monitor.

27. The computer of claim 24, wherein the interposing code is to disable access to the physical memory by the operating system.

28. The computer of claim 23, wherein the interposing code includes a kernel module of the operating system for allocating a block of the physical memory, pinning the block to prevent the operating system from using the block, and allocating the pinned block to the virtual machine monitor.

29. The computer claim 23, wherein the interposing code is to commence using the virtual machine monitor at runtime to manage memory translation.

30. The computer of claim 23, wherein the interposing code includes an operating system dual-mode driver to perform direct hardware control in a first mode and to communicate with a device driver of the virtual machine monitor in a second mode; and wherein the interposing code is to set the dual-mode driver to the second mode, and to direct I/O interrupts to interrupt handlers in the virtual machine monitor instead of to interrupt handlers in the operating system.

31. The computer of claim 23, wherein the operating system includes a dual-mode driver to perform direct hardware control in a first mode and to communicate with a device driver of the virtual machine monitor in a second mode; and wherein the interposing code is to set the dual-mode driver to the second mode, and to redirect I/O interrupts to interrupt handlers in the virtual machine monitor instead of to interrupt handlers in the operating system.

32. The computer of claim 23, wherein the interposing code is to commence I/O emulation of the I/O device at runtime.

33. The computer of claim 23, wherein the operating system includes interrupt handlers; wherein the virtual machine monitor includes interrupt handlers; and wherein the devirtualizing code is to redirect interrupts to the corresponding interrupt handlers of the operating system instead of to the interrupt handlers of the virtual machine monitor.

34. The computer of claim 33, wherein the devirtualizing code is to restore a privilege level of the operating system from a lower privilege level to a higher privilege level.

35. The computer of claim 33, wherein the devirtualizing code is to enable access of the physical memory by the operating system.

36. The computer of claim 23, wherein the devirtualizing code is to devirtualize the physical memory at runtime.

37. The computer of claim 36, wherein the virtual machine monitor is to allocate memory from an operating system to the virtual machine monitor; and wherein the devirtualizing code is to return the allocated memory to the operating system.

38. The computer of claim 23, wherein the devirtualizing code is to devirtualize the I/O device at runtime.

39. The computer of claim 38, wherein the operating system includes dual-mode drivers to perform direct hardware control in a first mode and communicate with device drivers of the virtual machine monitor in a second mode; and wherein the devirtualizing code is to set the dual-mode drivers to the first mode from the second mode, and to redirect I/O interrupts to handlers in the operating system instead of to handlers in the virtual machine monitor.

40. The computer of claim 38, wherein the devirtualizing code is to cease emulation of the I/O device at runtime.

41. An article for use with an operating system on computer hardware, the article comprising a computer-readable storage medium storing software that when executed by a computer causes the computer to:
 boot the operating system on the computer hardware such that the operating system has direct control of at least a portion of the computer hardware including a central processing unit (CPU), a physical memory, and an input/output (I/O) device;
 interpose a virtual machine monitor between the operating system and the computer hardware at runtime, wherein runtime includes a period of execution in the computer after booting and before shutdown of the computer, wherein the interposing occurs after booting of the computer, and wherein interposing the virtual machine monitor gives the virtual machine monitor direct control of the at least a portion of the computer hardware such that the operating system no longer has direct control of the at least a portion of the computer hardware; and
 devirtualize the at least a portion of the computer hardware at runtime after the virtual machine monitor has been interposed at runtime, wherein devirtualizing the at least a portion of the computer hardware comprises stopping the virtual machine monitor such that the operating system resumes having direct control of the at least a portion of the computer hardware.

42. The article of claim 41, wherein the virtual machine monitor and the operating system each include CPU interrupt handlers; and wherein the software is executable to cause privileged instructions to trap to the virtual machine monitor, and to cause interrupts and traps to be redirected to the corresponding virtual machine monitor interrupt handlers instead of to the operating system interrupt handlers.

43. The article of claim 42, wherein the software is executable to cause the privileged instructions to trap to the virtual machine monitor by reducing a privilege level of the operating system from a higher privilege level, and wherein the software causes control to be returned to the operating system at the reduced privilege level.

44. The article of claim 42, wherein the software is executable to cause access by the physical memory by the operating system to be disabled.

45. The article of claim 41, wherein the virtual machine monitor is for causing a kernel module of the operating system to allocate a block of the physical memory, pin the block to prevent the operating system from using the block, and allocate the pinned block to the virtual machine monitor.

46. The article of claim 41, wherein the software includes an operating system dual-mode driver to perform direct hardware control in a first mode and communicate with a corresponding device driver of a virtual machine monitor in a second mode; and wherein the dual-mode driver is set to the second mode when the at least the portion of the computer hardware is virtualized, and wherein I/O interrupts are redirected to interrupt handlers in the virtual machine monitor instead of interrupt handlers in the operating system.

47. The article of claim 41, wherein the operating system includes a dual-mode driver to perform direct hardware control in a first mode and communicate with a device driver of the virtual machine monitor in a second mode; and wherein the dual-mode driver is set to the second mode when the at least the portion of the computer hardware is virtualized, and wherein I/O interrupts are redirected from interrupt handlers in the operating system to interrupt handlers in the virtual machine monitor.

48. The article of claim 41, wherein the software is executable to cause I/O emulation of the I/O device to commence at runtime.

49. The article of claim 41, wherein the software causes the CPU to be devirtualized at runtime.

50. The article of claim 49, wherein the operating system includes first interrupt handlers; wherein the software includes second interrupt handlers; and wherein the software is executable to devirtualize by causing interrupts to be redirected to the corresponding first interrupt handlers instead of to the second interrupt handlers.

51. The article of claim 50, wherein the software is executable to devirtualize by causing a privilege level of the operating system to be restored from a lower privilege level to a higher privilege level.

52. The article of claim 50, wherein the software is executable to devirtualize by causing access of the physical memory by the operating system to be enabled.

53. The article of claim 41, wherein the software is executable to cause the physical memory to be devirtualized at runtime.

54. The article of claim 53, wherein if a part of the physical memory was allocated from the operating system to the virtual machine monitor prior to the runtime devirtualization, the software is executable to cause the allocated physical memory to be returned to the operating system as part of the runtime devirtualization.

55. The article of claim 53, wherein the software is executable to cause the physical memory to be remapped and wherein the software allows the operating system to manage address translation with respect to the devirtualized physical memory.

56. The article of claim 41, wherein the software is executable to cause the I/O device to be devirtualized at runtime.

57. The article of claim 56, wherein the operating system includes dual-mode drivers that perform direct hardware control in a first mode and communicate with virtual device drivers in a second mode; and wherein the software is executable to devirtualize by causing the dual-mode drivers to be set to the first mode.

58. The article of claim 56, wherein the software is executable to devirtualize by causing emulation of the I/O device to cease at runtime.

\* \* \* \* \*

UNITED STATES PATENT AND TRADEMARK OFFICE
CERTIFICATE OF CORRECTION

| | | |
|---|---|---|
| PATENT NO. | : 7,913,226 B2 | Page 1 of 1 |
| APPLICATION NO. | : 10/676557 | |
| DATED | : March 22, 2011 | |
| INVENTOR(S) | : David E. Lowell et al. | |

It is certified that error appears in the above-identified patent and that said Letters Patent is hereby corrected as shown below:

In column 10, line 28, in Claim 29, after "computer" insert -- of --.

Signed and Sealed this
Twenty-fifth Day of October, 2011

David J. Kappos
*Director of the United States Patent and Trademark Office*